US011743175B2

(12) United States Patent
Neeli

(10) Patent No.: US 11,743,175 B2
(45) Date of Patent: Aug. 29, 2023

(54) DYNAMICALLY EMPLOYING CONSTANT POWER SPECTRAL DENSITY IN MESH WLAN TRANSMISSIONS

(71) Applicant: Fortinet, Inc., Sunnyvale, CA (US)

(72) Inventor: Srinivasa Subbarao Neeli, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 22 days.

(21) Appl. No.: 17/566,829

(22) Filed: Dec. 31, 2021

(65) Prior Publication Data

US 2023/0216778 A1    Jul. 6, 2023

(51) Int. Cl.
*H04L 45/24* (2022.01)
*H04L 45/16* (2022.01)
*H04W 28/02* (2009.01)
*H04W 72/21* (2023.01)
*H04W 72/542* (2023.01)

(52) U.S. Cl.
CPC ............. *H04L 45/24* (2013.01); *H04L 45/16* (2013.01); *H04W 28/0205* (2013.01); *H04W 72/21* (2023.01); *H04W 72/542* (2023.01)

(58) Field of Classification Search
CPC .... H04L 45/24; H04L 45/16; H04W 28/0205; H04W 72/21; H04W 72/542
See application file for complete search history.

(56) References Cited

U.S. PATENT DOCUMENTS

| | | | |
|---|---|---|---|
| 2008/0225737 A1* | 9/2008 | Gong | H04L 47/822 370/252 |
| 2018/0041247 A1* | 2/2018 | Zakaria | H04B 3/542 |
| 2020/0162944 A1* | 5/2020 | Barton | H04W 24/04 |
| 2020/0226084 A1* | 7/2020 | Das Sharma | H04L 45/24 |
| 2023/0054755 A1* | 2/2023 | Patil | H04W 76/15 |

* cited by examiner

*Primary Examiner* — Michael A Keller
(74) *Attorney, Agent, or Firm* — Law Office of Dorian Cartwright; Dorian Cartwright

(57) ABSTRACT

Redundant upstream mesh links are formed with a gateway access point for each of the radio capabilities. A resource load is measured across each of the redundant upstream mesh links. During runtime, a packet is received for upstream (or downstream) transmission from a specific client from the plurality of clients. An upstream link is selected for transmission of the packet from the redundant upstream mesh links for transmission of the packet and packets of the packet session, based on a highest link quality available from the plurality of mesh links according to the resource load measurement.

20 Claims, 7 Drawing Sheets

DYNAMICALLY EMPLOYING CONSTANT POWER SPECTRAL DENSITY IN MESH WLAN TRANSMISSIONS

FIELD OF THE INVENTION

The invention relates generally to computer networking, and more specifically, to dynamically employing PSD (power spectral density) in mesh WLAN (wireless local access network) transmissions.

BACKGROUND

PSD in wireless networks is defined as the power present in the radio wave signal as a function of frequency, i.e., power per unit frequency. In short, PSD specifies the amount of power over a given bandwidth in which the radio was operating.

PSD plays an important role in wireless transmissions. In general, for wireless RF communications, each time the channel bandwidth is doubled, noise floor will also be doubled. Thus, in existing, legacy frequency bands (i.e., 2.4 GHz and 5 GHz) which uses constant transmit power instead of constant PSD, maximum signal quality (i.e., SNR) will be achieved only when radios operate in lower bandwidths (i.e., 20 Mhz). Each time radio operating bandwidth is increased to 40 Mhz, 80 Mhz, or 160 Mhz, the noise floor tagged to the new bandwidths will also be added. Hence, the signal quality will be degraded for communications which are happening over higher bandwidths starting from 40 Mhz to 160 Mhz.

In the new standard of 6 GHz spectral, PSD can be made as a constant value instead of constant transmit power. As a result, every time we double our channel bandwidth we still take the effect of noise floor hit, but as PSD is constant, EIRP (Equivalent Isotropically Radiated Power) value will be higher even though radio was operating over higher bandwidths like. As per regulations, constant PSD value of 5 dbm/MHz is standardized for radios operating in 6 GHz spectral which can be increased in further research up to 8 dbm/MHz. The formula which can be used to identify EIRP for constant PSD across different bandwidths is EIRP=PSD+ 10 log(channel width).

Deployments which are done using mesh topology are often affected by wireless medium congestion which leads to network outage. As all the devices including access points and wireless clients connected with the access points need to tune their radios over a single frequency for achieving their wireless transmissions by listening to each other, medium will get congested. To service the wireless clients connected over the edge (or child) access points, edge access points need to forward/re-transmit the same traffic of its wireless clients to the gateway access point over the same frequency as the edge access point backhaul is over wireless link to the gateway access point. Once the wireless backhaul link gets congested all the devices including access points and wireless clients in the Mesh network need to back off their radios until they get a chance to win the medium, which causes latency and performance degradation.

Adding to the network congestion while sharing the same channel, legacy RF band (2.4 Ghz and 5 Ghz) capable devices has to face the legacy PSD effect while transmitting over higher bandwidths as ERIP is constant in legacy RF bands. Hence higher bandwidth capable wireless transmissions will get effected as noise floor will be doubled for every increase in bandwidth followed by low SNR value.

Also, as said above, wireless transmissions/traffic of Wireless client devices which are associated over the edge access points need to be forwarded/re-transmitted twice over the same medium to reach the final gateway access points. So wireless client radio transmissions signal quality will be degraded at any time while getting transmitted either from Wireless clients to their respective edge access points or from edge access points to the respective gateway access points. The same is applicable even for the transmissions happening from gateway access points to the edge access points followed by edge access points to the respective Wireless clients.

Therefore, what is needed is a robust technique for dynamically employing constant PSD in mesh WLAN transmissions. The solution should address the PSD effect of legacy clients as well.

SUMMARY

These shortcomings are addressed by the present disclosure of methods, computer program products, and systems for dynamically employ PSD floors in mesh WLAN transmissions.

In one embodiment, mesh capabilities of upstream links in the mesh network to a gateway access point and downstream links to a plurality of clients are identified. Redundant upstream mesh links can be formed with a gateway access point for each of the radio capabilities. A resource load is measured across each of the redundant upstream mesh links.

In another embodiment, during runtime, a packet is received for upstream (or downstream) transmission from a specific client from the plurality of clients. An upstream link is selected for transmission of the packet from the redundant upstream mesh links for transmission of the packet and packets of the packet session, based on a highest link quality available from the plurality of mesh links according to the resource load measurement.

Advantageously, computer network performance is improved with network service level performance. Furthermore, backhaul WLAN traffic congestion is reduced for improved network performance.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for dynamically employing PSD floors in WLAN transmissions.

One of ordinary skill in the art will recognize many additional variations made possible by the succinct description of techniques below.

I. Systems for Intelligent Constant PSD Mesh WLAN Transmissions (FIGS. 1-2)

Figure 1A:
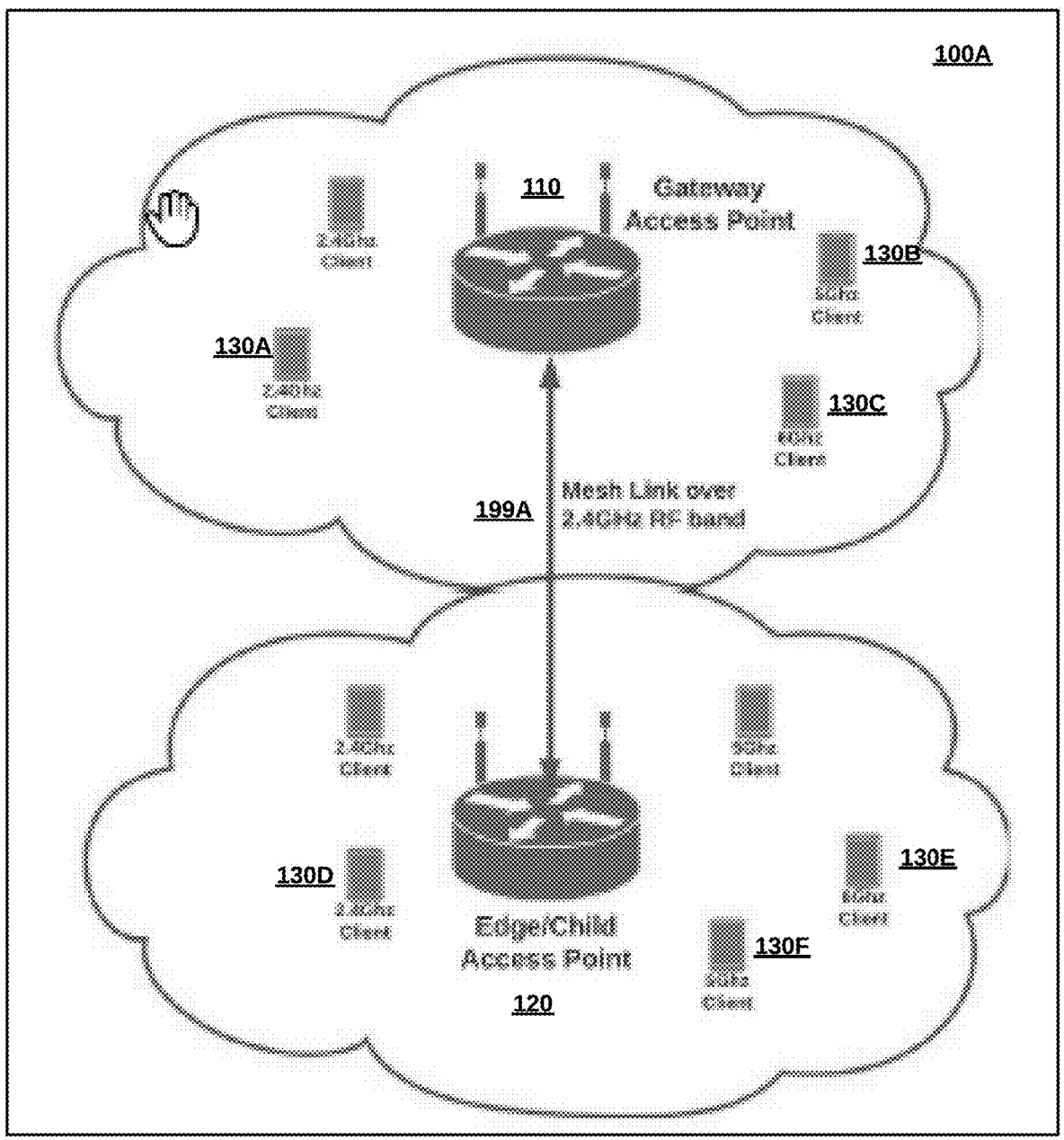
FIG. 1A is a high-level block diagram illustrating a system in a standard operating mode, according to an embodiment.

FIG. 1A is a high-level block diagram illustrating a system 100A in a standard operating mode, according to an embodiment. The system comprises an intelligent mesh server 105, a gateway access point 110 and an edge access point 120. Many other configurations are possible, for example, with additional network components such routers, switches, repeaters, firewalls, and the like. Also, there can be many more or fewer clients in FIG. 1. The system components can be implemented in computer devices with non-transitory source code, such as set forth below with reference to FIG. 6.

The components of the system 100 are coupled in communication over the data communication network. Preferably, the gateway access point 110 is connected to the data communication system via hard wire. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11.

In one embodiment, the gateway access point 110 and the edge access point 120 operate in dual modes, a standard operating mode and an intelligent mesh mode, as discussed in detail below. Standard operating mode generally uses a single backhaul frequency, 2.4 GHz in FIG. 1A but can also be 5 GHz or 6 GHz. By contrast, intelligent mesh mode generally uses multiple backhaul frequencies, 2.4 GHz, 5 GHz and 6 GHz in FIG. 1B but future frequencies and bandwidths can be substituted.

A change in modes can be triggered by different conditions. An increase in network traffic, for instance, could be handled better in intelligent mesh mode. Also, a high number or ratio of legacy clients can be a factor. However, when network traffic is down, or the high number of legacy clients has dwindled, the overhead of intelligent mesh mode can trigger a switch back to standard operating mode.

Figure 1B:
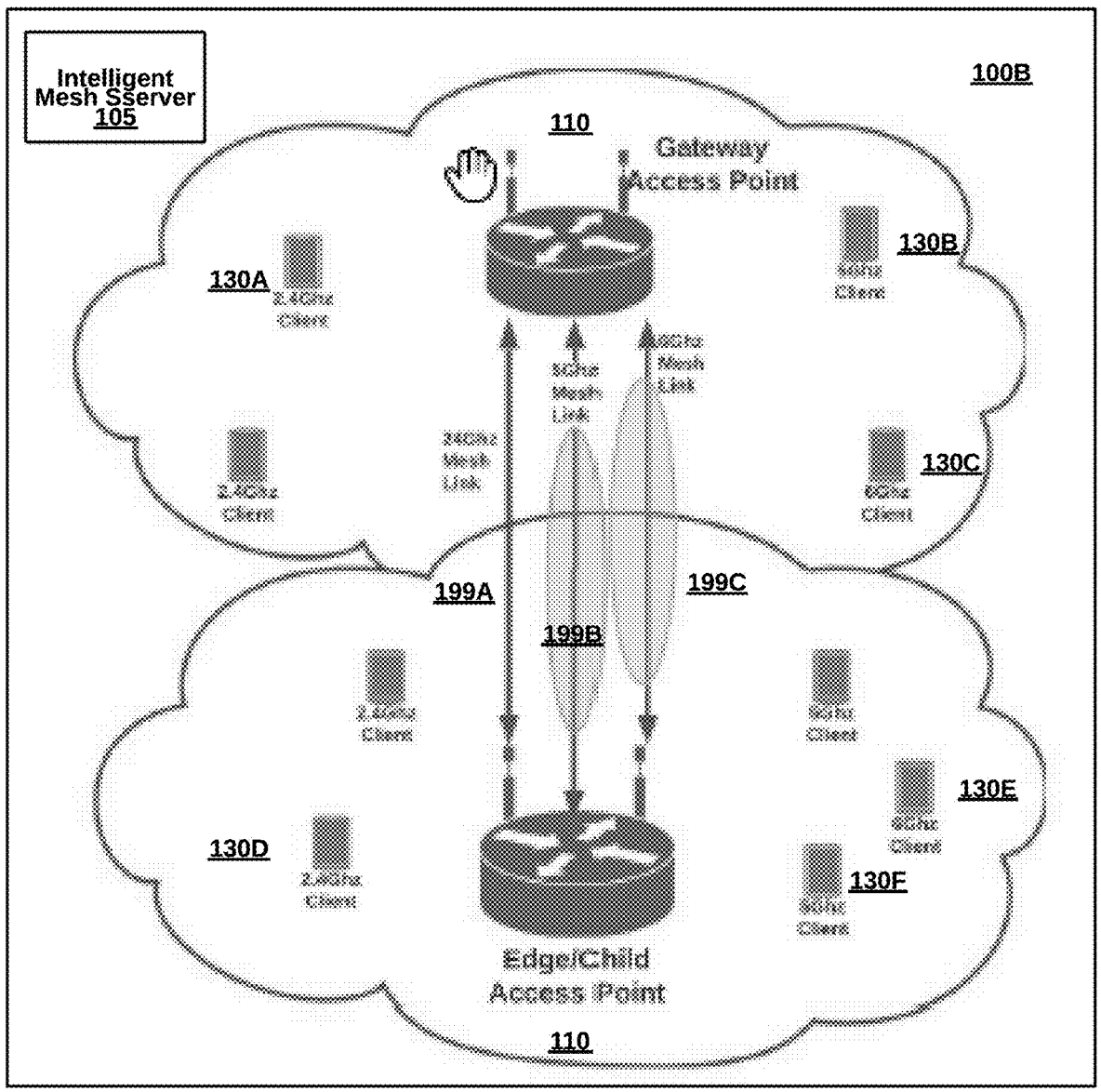
FIG. 1B is a high-level block diagram illustrating a system to dynamically employ constant PSD in mesh WLAN transmissions, according to an embodiment.
Figure 2:
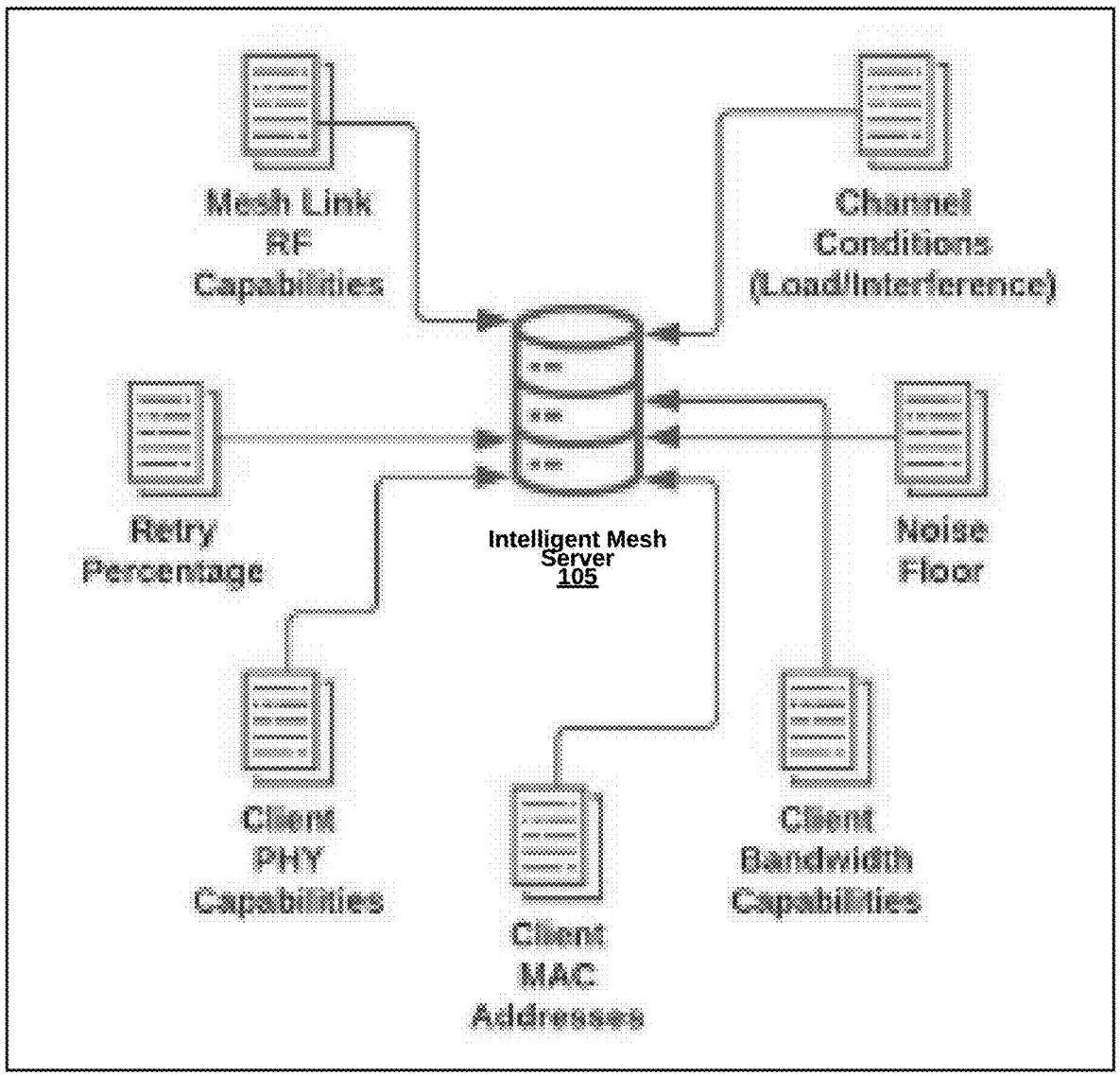
FIG. 2 is a more detailed block diagram illustrating an intelligent mesh server of the system of FIG. 1, according to an embodiment.
Figure 3:
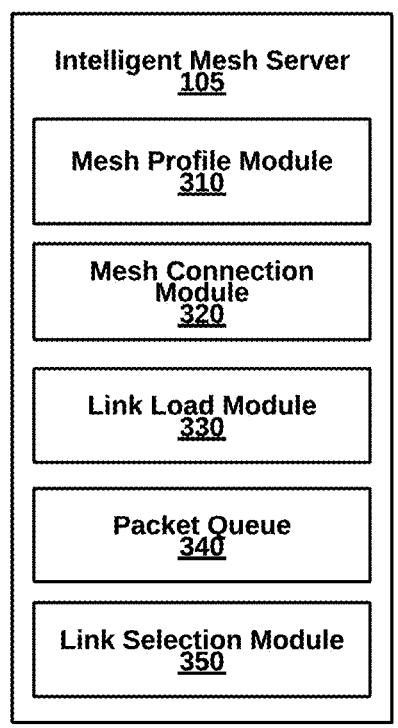
FIG. 3 is a more detailed block diagram illustrating an intelligent mesh module of the system of FIG. 1, according to an embodiment.

FIG. 1B is a high-level illustration of a system 100B to dynamically employ constant PSD in mesh WLAN transmissions, according to an embodiment.

The intelligent mesh server 110, in one embodiment, receives input with static and real-time information concerning the mesh network. As shown in FIG. 2, inputs include mesh link RF capabilities 210, retry percentage 220, client PHY capabilities 230, client MAC addresses 240, client bandwidth capabilities 250, noise floor 260, and channel conditions 270.

The gateway access point 120 connects the mesh network to the wired network with a wireless backhaul, with an intelligent selection between redundant upstream links 122. A gateway access point 120 can include three different radio types for connection to edge access point 130 which has the same capabilities, as discussed more below. Preferably, the upstream link is non-interfering with downstream links to clients and upgrades transmissions for legacy clients. For example, a 2.5 GHz or a 5 GHz transmission is upgraded to 6 GHz with constant PSD to keep noise floors within tolerable levels for quality of service guarantees. The PSD effect of legacy devise can be overcome.

In some embodiments, the gateway access point 120 also acts as a traditional access point by serving clients directly in addition to the edge access point 130. In more detail, the gateway access point 120 is configured with one or more SSIDs that uniquely identifies on networks. An SSID is broadcast in beacons to advertise the network connection to potential clients. A client responds to the beacon with a connection request that leads to the connection for exchanging data packets.

The edge access points 130 connects clients to the mesh network and to the gateway access point 120 for backhaul access, with downstream links. While conventional access points are directly connected to the backhaul, mesh networks include access points that are not directly connected to the backhaul. For example, the edge access point 130 connects to the three redundant upstream links 122. In one embodiment, three separate network interface cards are installed to the edge access point 130 and the gateway access point 120. The edge access point 130 can also use SSIDs as described above.

FIG. 2 is a more detailed illustration of an intelligent mesh module 210 of the edge access point 230 of FIG. 1. The intelligent mesh module 210 includes a mesh profile module 210, a mesh connection module 220 and a link load module 230, a packet queue 240, and a link selection module 250. The modules can be implemented in source code stored in non-transitory memory executed by a processor. Alternatively, the modules can be implemented in hardware with microcode. The modules can be singular or representative of functionality spread over multiple components. Many other variations are possible.

The mesh profile module 210 can identify mesh capabilities of upstream links in the mesh network to a gateway access point and downstream links to a plurality of clients. A table can map clients to MAC addresses and a list of capabilities. A mesh topology can be implemented, including assigning roles as edge or gateway.

The mesh connection module 220, in one embodiment, forms redundant upstream mesh links (e.g., 2 or 3 links) with a gateway access point for each of the radio capabilities.

The link load module 230 can measure a resource load across each of the redundant upstream mesh links. The measurements can be taken on-demand or periodically. Predictive modeling can provide richer data based on the measurements over time. In an embodiment, measurements include channel utilization, noise floor, interference, and other parameters.

The packet queue 240 to receive a packet for upstream transmission from a specific client from the plurality of clients. The packet queue 240 can be any appropriate computer memory, such as cache, RAM, hard drive, or the like.

The link selection module 250 chooses an upstream link from the redundant upstream mesh links. The decision is based on a highest link quality available from the plurality of mesh links according to the resource load measurement. A highest quality link is preferred, such as a 6 GHz link. Depending on the network congestion, some network packets are redirected to a different radio. Redirection is preferred over backoff. For instance, a client transmitting at 2.4

GHz as a legacy device, can be upgraded to 6 GHz. In some cases, a client transmitting at 6 GHz has network traffic switched to 5 GHz based on real-time conditions.

Backoff is still available to reduce network congestion. After attempting to transmit over the three radios, which can all be busy at the same time, a packet or packet session can return to a default backoff. After backoff, additional attempts can be made over the three radios.

II. Methods for Intelligent Constant PSD Mesh WLAN Transmissions (FIGS. 4-5)

Figure 4:
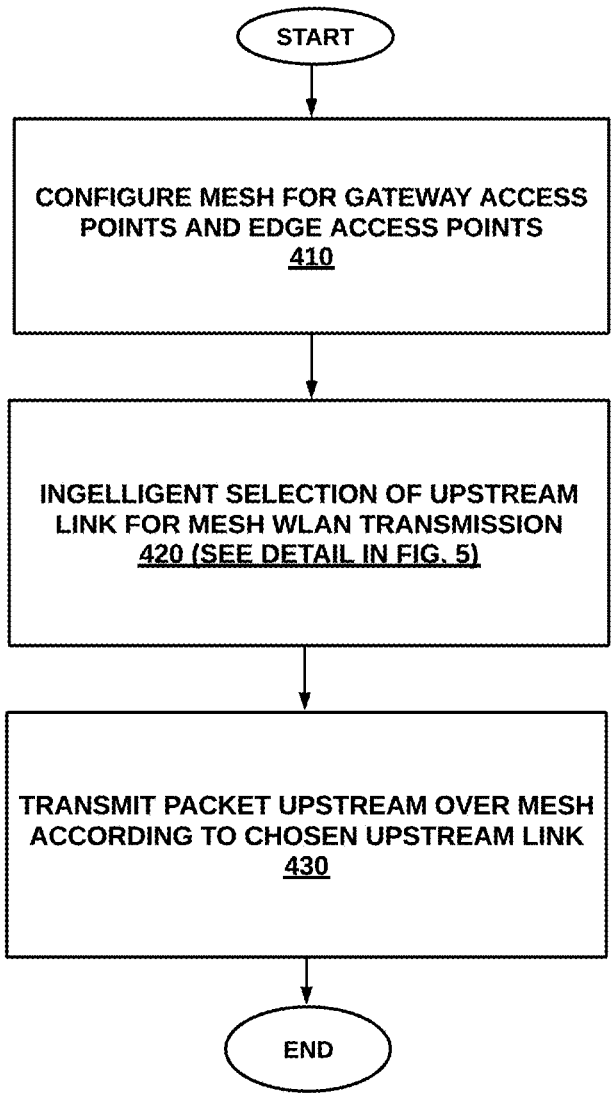
FIG. 4 is a high-level flow diagram illustrating a method for dynamically employing constant PSD in WLAN transmissions, according to one preferred embodiment.
Figure 5:
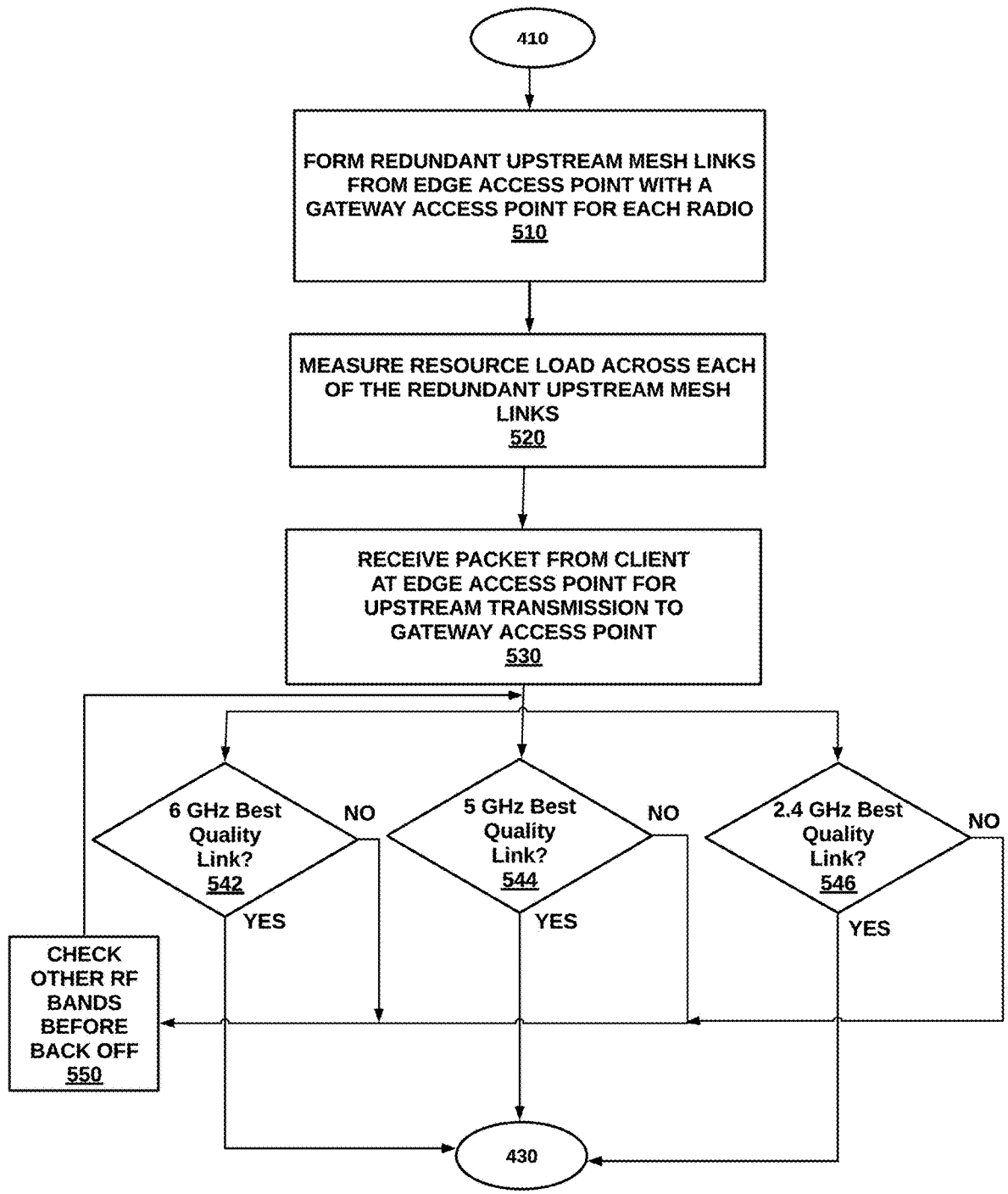
FIG. 5 is a more detailed flow diagram illustrating a step of selecting a highest quality link based on link load, according to an embodiment.

FIG. 4 is a high-level flow diagram illustrating a method for dynamically employing constant PSD in mesh WLAN transmissions, according to one embodiment. The method 500 can be implemented, for example, by the system 100 of FIG. 1. The steps are merely representative groupings of functionality, as there can be more or fewer steps, and the steps can be performed in different orders. Many other variations of the method 500 are possible.

At step 410, mesh capabilities of upstream links are identified in the mesh network to a gateway access point. Additionally, mesh capabilities of downstream links to a plurality of clients are identified.

At step 420, redundant upstream mesh links are formed with a gateway access point for each of the radio capabilities.

At step 430, a measure a resource load is measured across each of the redundant upstream mesh links. In an embodiment, measurements include channel utilization, noise floor, interference, and other parameters.

At step 440, a packet for upstream transmission is received in a packet queue from a specific client from the plurality of clients.

A step 450, a link selection module to choose an upstream link from the redundant upstream mesh links, based on a highest link quality available from the plurality of mesh links according to the resource load measurement. FIG. 5 is a more detailed flow diagram illustrating the step 450 of choosing the upstream link.

Specifically, at step 510 redundant upstream mesh links are formed from edge point with a gateway access point for each radio. At step 520, resource loads are measured across each of the redundant upstream mesh links. At step 530, a packet is received from a client at runtime for upstream transmission to the gateway access point. Next, a recursive process can occur in which an attempt is made to use the 6 GHz link, at step 542, and next the 5 GHz link, at step 544, the 2.4 GHz link, at step 546. Thus other RF bands are checked before resorting to backoff, at step 550. Ultimately backoff may be required depending on the circumstances, as the details are implementation-specific. In one case, an access point diversifies channels by transmitting with a gateway access point at a different frequency than clients. If clients transmit at 2.4 GHZ or 5 GHz, transmissions to the gateway access point are attempted at 6 GHz to avoid interference. However, based on traffic, a duplicate frequency may be the best choice.

III. Generic Computing Environment (FIG. 6)

Figure 6:
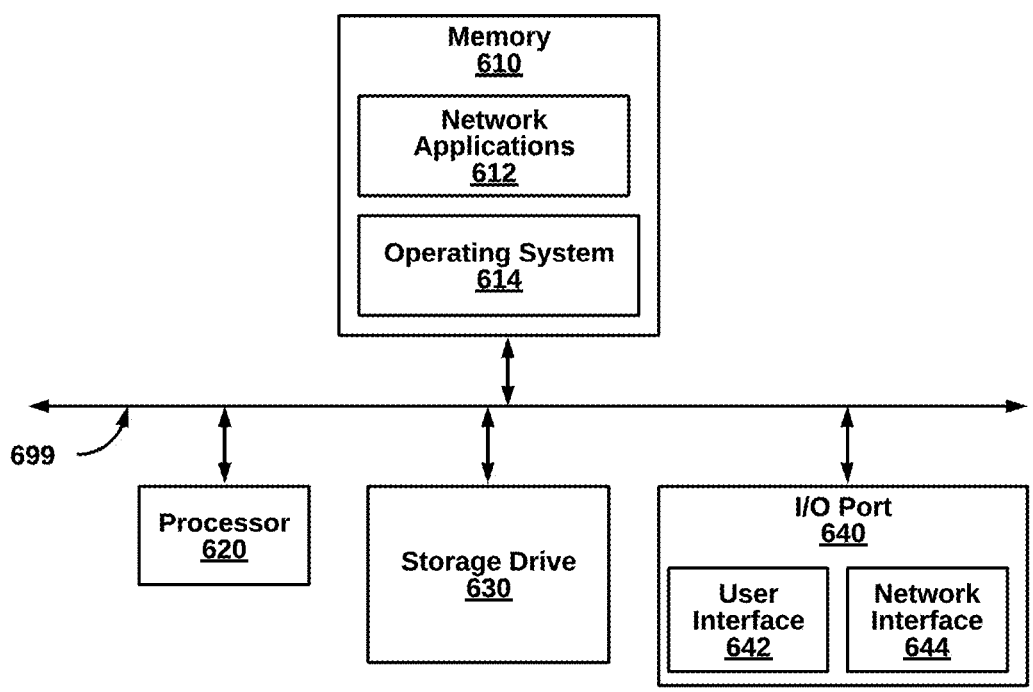
FIG. 6 is a block diagram illustrating a computing device capable of implementing components of the system, according to an embodiment.

FIG. 6 is a block diagram illustrating a computing device 600 capable of implementing components of the system, according to an embodiment. The computing device 600, of the present embodiment, includes a memory 610, a processor 620, a storage drive 630, and an I/O port 640. Each of the components is coupled for electronic communication via a bus 699. Communication can be digital and/or analog and use any suitable protocol. The computing device 600 can be any of components of the system 100 (e.g., intelligent mesh server 105, gateway access point 110, or edge access point 120), other networking devices (e.g., an access point, a firewall device, a gateway, a router, or a wireless station), or a disconnected device.

Network applications 612 can be network browsers, daemons communicating with other network devices, network protocol software, and the like. An operating system 614 within the computing device 600 executes software, processes. Standard components of the real OS environment 614 include an API module, a process list, a hardware information module, a firmware information module, and a file system. The operating system 614 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. An edge access point in a mesh network of a plurality of edge access points and at least one gateway access point that is connected to a data communication network, to dynamically employ constant PSD (power spectral density) floors in WLAN (wireless local access network) transmissions, the edge access point comprising:
   a processor;
   a communication interface, communicatively coupled to the mesh network; and
   a memory, communicatively coupled to the processor and storing:
      a mesh profile module to identify mesh capabilities of upstream links in the mesh network to a gateway access point and downstream links to a plurality of clients;
      a mesh connection module to form redundant upstream mesh links with a gateway access point for each of the radio capabilities;
      a link load module to measure a resource load across each of the redundant upstream mesh links;
      a packet queue to receive a real-time packet for upstream transmission; and
      a link selection module to choose an upstream link from the redundant upstream mesh links for transmission of the real-time packet, based on a highest link quality available from the plurality of mesh links according to the resource load measurement,
   wherein the network communication interface transmits the real-time packet according to the chosen upstream link.

2. The edge access point of claim 1, wherein the redundant links comprise a 2.4 GHz link, a 5 GHz link, and a 6 GHz link.

3. The edge access point of claim 1, wherein the link selection module prioritizes a 6 GHz link over a 5 GHz link, and prioritizes the 5 GHz link over a 2.4 GHz link.

4. The edge access point of claim 1, wherein the downstream link comprises a 2.4 GHz or 5 GHz link due to legacy capabilities of a legacy client without PSD enhancements, and upstream link comprises a 6 GHz link with PSD enhancements.

5. The edge access point of claim 1, further comprising an SSID module to advertise an SSID for each of the upstream links.

6. The edge access point of claim 1, further comprising a client management module to configure client profile of capabilities for clients associated with the mesh nodes.

7. The edge access point of claim 1, wherein the upstream link comprises a constant PSD over different bandwidths of 6 GHz transmission and the downstream link comprises a constant transmit power and a variable PSD that increases with increased bandwidth.

8. The edge access point of claim 1, wherein a transmission bandwidth of the upstream link comprises one of 80 MHz and 160 MHz.

9. The edge access point of claim 1, wherein the link module upstream link choice applies to additional packets of a packet session including the specific packet.

10. The edge access point of claim 1, wherein a packet is received over one of the redundant upstream links for transmission to a downstream link.

11. The edge access point of claim 1, wherein the memory further comprises a mesh controller to enable and disable dynamic decision mode for the upstream links, wherein when disabled, the edge access point operates as a legacy device.

12. A method in an edge access point in a mesh network of a plurality of edge access points and at least one gateway access point that is connected to a data communication network, for dynamically employ constant PSD (power spectral density) floors in WLAN (wireless local access network) transmissions, the method comprising the steps of:
   identifying mesh capabilities of upstream links in the mesh network to a gateway access point and downstream links to a plurality of clients;

forming redundant upstream mesh links with a gateway access point for each of the radio capabilities;

measuring a resource load across each of the redundant upstream mesh links;

receiving a packet for upstream transmission from a specific client from the plurality of clients; and choosing an upstream link from the redundant upstream mesh links for transmission of the packet and packets of the packet session, based on a highest link quality available from the plurality of mesh links according to the resource load measurement.

13. The method of claim 12, wherein the redundant links comprise a 2.4 GHz link, a 5 GHz link, and a 6 GHz link.

14. The method of claim 12, wherein the link selection module prioritizes a 6 GHz link over a 5 GHz link, and prioritizes the 5 GHz link over a 2.4 GHz link.

15. The method of claim 12, wherein the downstream link comprises a 2.4 GHz or 5 GHz link due to legacy capabilities of a legacy client without PSD enhancements, and upstream link comprises a 6 GHz link with PSD enhancements.

16. The method of claim 12, further comprising an SSID module to advertise an SSID for each of the upstream links.

17. The method of claim 12, further comprising a client management module to configure client profile of capabilities for clients associated with the mesh nodes.

18. The method of claim 12, wherein the upstream link comprises a constant PSD over different bandwidths of 6 GHz transmission and the downstream link comprises a constant transmit power and a variable PSD that increases with increased bandwidth.

19. The method of claim 12, wherein a transmission bandwidth of the upstream link comprises one of 80 MHz and 160 MHz.

20. A non-transitory computer-readable media in an edge access point in a mesh network of a plurality of edge access points and at least one gateway access point that is connected to a data communication network, implemented at least partially in hardware for, when executed by a processor, dynamically employ constant PSD (power spectral density) floors in WLAN (wireless local access network) transmissions, the method comprising the steps of:

identifying mesh capabilities of upstream links in the mesh network to a gateway access point and downstream links to a plurality of clients;

forming redundant upstream mesh links with a gateway access point for each of the radio capabilities;

measuring a resource load across each of the redundant upstream mesh links;

receiving a packet for upstream transmission from a specific client from the plurality of clients; and choosing an upstream link from the redundant upstream mesh links for transmission of the packet and packets of the packet session, based on a highest link quality available from the plurality of mesh links according to the resource load measurement.

* * * * *